Oct. 22, 1957   J. VAN TILBURG   2,810,372
MIXTURE-COMPRESSING PISTON-COMBUSTION ENGINE
Filed June 28, 1954

JAN VAN TILBURG
    INVENTOR.

BY Wenderoth, Lind & Ponack
    ATTORNEYS

United States Patent Office 2,810,372
Patented Oct. 22, 1957

2,810,372
MIXTURE-COMPRESSING PISTON-COMBUSTION ENGINE

Jan Van Tilburg, Alkmaar, Netherlands

Application June 28, 1954, Serial No. 439,770

Claims priority, application Netherlands July 2, 1953

5 Claims. (Cl. 123—41.16)

The present invention relates to a mixture-compressing piston-combustion engine.

It is known that the efficiency of such engines increases as a larger compression ratio is utilized. Another advantage of a higher compression-ratio is the lower weight per developed horse-power. An indefinite increase of the compression-ratio, however, is impossible because of the tendency to produce detonations or knocking.

Detonation occurs if the speed of the combustion of the first ignited portion of the charge in the combustion space is so large that this portion, because of its expansion, compresses the unignited portion (end gas) above a certain temperature.

If the temperature rise of this end gas increases so rapidly, as a result of this compression, that it cannot be reduced rapidly enough by heat conductance or otherwise, the remainder of the charge will spontaneously and nearly simultaneously ignite. By using special anti-knock fuel and/or by applying anti-knock means (e. g. tetra ethyl lead) the combustion rate of which is lower, whereby the combustion rate is retarded, it is possible to obtain a higher anti-knock value. The special anti-knock fuel is more expensive than the regular and addition of tetra ethyl lead may cause lead deposits in the combustion space and hence fouling of the spark plug.

The invention has as an object to prevent the detonation of a mixture-compressing piston-combustion engine at high compression ratios, without making use of special fuel. It is also an object to obtain a still higher compression-ratio with special fuel.

According to the invention the combustion space is divided into interconnected chambers at or near the end of the compression stroke.

According to the invention the piston on the side facing the combustion engine is provided with one or more upright walls thereon.

Said walls divide the combustion space at or near the end of the compression stroke into two or more spaces concentric with respect to the point of the area of ignition.

Furthermore according to the invention the walls may have such a shape that the spaces into which these walls divide the combustion space, have a substantially circular or segment-like shape. In addition the walls may be internally cooled.

Figure 1:
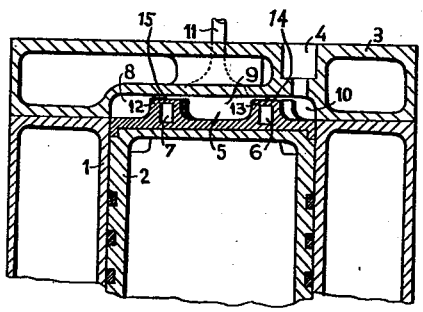
Figure 2:
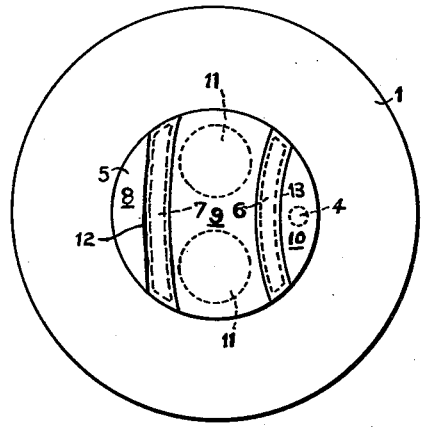

The invention is set forth in the following specification and the accompanying drawing, in which:

Fig. 1 is a side elevation view, in section, of a mixture-compressing combustion engine with head valves, the spark-plug being arranged to the side of the cylinder head; and Fig. 2 is a plan view of the combustion engine according to Fig. 1 with the cylinder head removed.

According to Fig. 1 a piston 2 is movable in the axial direction of the cylinder 1. To one side of the cylinder head 3 a bore 4 for a spark plug is located.

In the drawing the piston is in the highest position in the cylinder at the end of the compression stroke. A space 5 remains between the piston and the cylinder head. This space is divided into chambers in that on the piston obstructions in the form of concentric ribs 12 and 13 are provided, so that the concentric spaces 8, 9 and 10 are formed which are interconnected by the narrow openings 14 and 15 which remain between the upper edge of the ribs and the cylinder head. The ribs 12 and 13 and spaces 8, 9 and 10 are concentric about the bore 4 for a spark plug.

Overhead valves 11 are provided in cylinder head 3 which open into space 9 as shown in dotted outline in Fig. 2.

On ignition of the spark plug, the part of the charge which is present in the chamber 10 will first burn in the combustion space. The combustion path is short and therefore favorable in connection with detonation. However, the expansion occurring with this combustion is not able to compress the unignited portion of the mixture in the chambers 8 and 9 above such a temperature that the mixture will ignite (detonate) spontaneously and practically simultaneously. This is because the ribs 12 and 13 and the cylinder head provide only narrow openings 14 and 15 through which the flame can displace itself. The opening 14 then serves as an annular spark plug for the space 9 and the opening 15 serves as an annular spark plug for space 8. The combustion path across space 9 is also short and therefore favorable in connection with detonation. The small quantity of gas which is allowed to pass through the opening 14 causes a large whirl in space 9 due to which the tendency to knock decreases even more.

The ribs 12 and 13 also provide means for cooling the compressed gases which decreases the tendency to knock still more. Chambers 6 and 7 are provided in ribs 12 and 13, each of which may be filled with a cooling medium such as a low melting point metal, e. g. sodium.

I claim:

1. In a mixture-compressing piston-cylinder internal combustion engine having a cylinder and a piston reciprocally slidable therein defining a space having two substantially parallel walls formed by the piston and the cylinder head when the piston is in its closest position to the cylinder head and a spark producing means projecting into said space, that improvement comprising at least one cooled obstruction integral with one of said walls and projecting into said space forming a plurality of concentric spaces around said spark producing means, said obstruction terminating short of the other of said substantially parallel walls to leave an annular gap between adjacent substantially concentric spaces.

2. The improvement as claimed in claim 1 in which said obstruction is attached to the end of said piston.

3. The improvement as claimed in claim 1 in which said obstruction has an internal cooling chamber and a cooling medium therein.

4. The improvement as claimed in claim 3 in which the cooling medium is a low melting point metal.

5. The improvement as claimed in claim 3 in which the cooling medium is sodium.

References Cited in the file of this patent

UNITED STATES PATENTS

| 788,057 | Morrison | Apr. 25, 1905 |
| 1,605,838 | Hawley | Nov. 2, 1926 |
| 1,719,215 | Faroy et al. | July 2, 1929 |
| 2,157,764 | Langrognet | May 9, 1939 |
| 2,537,174 | Townhill | Jan. 9, 1951 |

FOREIGN PATENTS

| 419,500 | Germany | Oct. 5, 1925 |
| 849,897 | France | Dec. 4, 1939 |